United States Patent [19]

Vogelman

[11] 4,402,010
[45] Aug. 30, 1983

[54] DIGITAL TELEVISION SIGNAL PROCESSING AND TRANSMISSION SYSTEM

[75] Inventor: Joseph Vogelman, Roslyn, N.Y.

[73] Assignee: VVS Energy Patent Fund, Inc., Atlantic Beach, N.Y.

[21] Appl. No.: 457,047

[22] Filed: Jan. 10, 1983

Related U.S. Application Data

[63] Continuation-in-part of Ser. No. 282,018, Jul. 10, 1981, abandoned.

[51] Int. Cl.³ .............................................. H04N 5/04
[52] U.S. Cl. ................................ 358/133; 358/135; 358/260; 358/903; 358/136
[58] Field of Search ............... 358/105, 135, 136, 903, 358/133, 260

[56] References Cited

U.S. PATENT DOCUMENTS 3,761,613  9/1973  Limb ........................... 358/136

3,971,888  7/1976  Ching et al. ................... 358/133
4,276,544  6/1981  Iinuma ........................... 358/133

Primary Examiner—John C. Martin
Assistant Examiner—Edward L. Coles
Attorney, Agent, or Firm—Hopgood, Calimafde, Kalil, Blaustein & Judlowe

[57] ABSTRACT

An input signal source of any form (e.g. camera or recorder) supplies a standard base band video wave. This video signal is fed to a conventional analog-to-digital converter (11) which samples the incoming wave train at a rate of 8 megahertz under the control of a system clock of a microprocessor (15). The microprocessor (15) recognizes the frame and line sync information from a sync detector 18 thereof, and activates a 600-byte current line memory (120 such that one line of scanned, a megahertz sampled television video information is stored therein. The first line of frame, there the microprocessor (15) computes first, second and third order differences and encodes information according to an algorithms.

11 Claims, 4 Drawing Figures

TRANSMITTER

DIGITAL TELEVISION SIGNAL PROCESSING AND TRANSMISSION SYSTEM

This is a continuation-in-part of my application Ser. No. 282,018, filed on July 10, 1981, now abandoned.

This invention relates to electronic signal transmission and, more specifically, to a television signal-processing and transmission system using digital techniques and capable of reducing the frequency bandwidth for the transmission of such signals. Since one frame of a television signal is essentially equivalent to a single page of facsimile, this invention may also be used for the transmission of facsimile or any other scanning system.

The required bandwidth in television and other scanning systems results from the rate of change of intensity along horizontal strips of the scanned configuration. In television, the scanning rate is uniform, and the bandwidth required is that needed to transmit the fastest rate of change in intensity needed for satisfactory picture quality. Since the bandwidth requirement is set for the greatest rate of change of intensity, the bandwidth is being wasted for all but a very small increment of transmission time.

It is an object of the present invention to provide a television signal transmission system which reduces the required transmission bandwidth with little or no deterioration in quality. In addition, the resultant signals because of their digital format can be reamplified and reprocessed without limit and without significant loss in signal-to-noise ratio. In addition, the security of the transmission can be greatly enhanced by appropriate binary substitution coding.

It is another object of this invention to provide a coding and decoding methodology which will vary the duration of each scan line and each frame such that the assigned transmission bandwidth is optimally utilized at all times. When the rate of change is slow, the transmission time is very short; when the rate of change is fast, the transmission time is long.

It is a further object of this invention to provide a system in which conventional television receiving systems will be precluded from utilizing the transmitted signals for television viewing without the receiving and processing equipment of this invention.

It is yet another object of this invention to provide a system that can be further security enhanced by binary substitution coding on a daily, weekly, monthly or individualized user basis.

Figure 1:
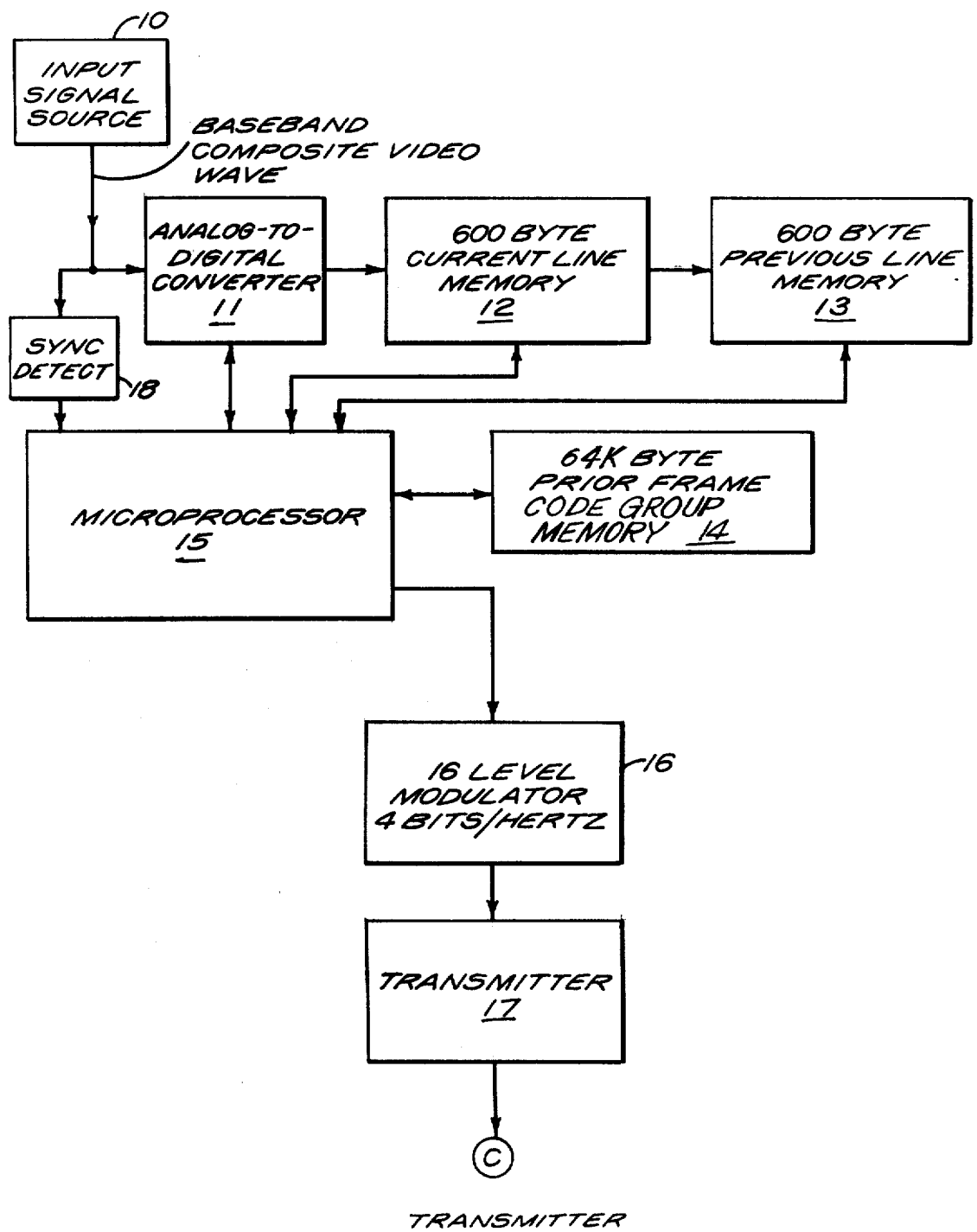
FIG. 1 is a block diagram illustrating a transmit unit in accordance with the invention.

For standard American television transmission the intensity video information is limited to a bandwidth of 4 megahertz with the remainder of a 6 megahertz channel being used for the lower vestigial sideband, the color carrier and the audio transmissions. The intensity processing described herein can be applied to the color information by analogy since both are fundamentally the result of the same scanning process.

In a scanning system where lines are scanned at a uniform rate, the complexity of the picture being processed has no effect on the bandwidth. Thus two pictures, one consisting of a black-to-white alteration at a 4 megahertz rate, and another picture providing only a single variation in the entire picture, consume the same bandwidth, and in conventional television systems take the same (fixed) time to scan. In addition, the complex synchronizing signals to signal the start of each frame and line occupy a major portion of the bandwidth and about 20% of the transmission time.

It is the purpose of this invention to optimize the transmission time by sending only changes in information content at a rate equal to the maximum rate commensurate with the assigned bandwidth.

A 4 megahertz signal can be said to consist of 8 million cells, i.e., one corresponding to the minimum value region and one corresponding to the maximum value region. Because of the nature of human vision, a scanned line with changes at a 4 megahertz rate would be seen as a grey level intermediate the minimum and maximum, and a single cycle of a 4 megahertz intensity wave would not be seen at all in American television. Thus, changes at this rate can be transmitted as intermediate grey levels covering two or more cells or not transmitted at all. In the case of a series of changes at a 4 megahertz rate where each peak is higher or lower than the previous peak, the combined wave can be transmitted as a slope of intermediate grey levels. Thus, a scanned line of 4 megahertz changes in which the peaks linearly increase from a low initial value to a higher final value can be transmitted as a single slope signal to describe the entire scanned line.

The present invention transmits each scan line at a rate inversely proportionate to the information content of the line being scanned. This "variable velocity" transmission of the scanned information is restored to constant velocity (i.e., fixed period) scanned data at the receive unit so that it may be viewed on conventional television receivers.

The present invention further reduces the trasmission time by not transmitting the complete wave form of the frame and line synchronizing information. A coded signal is transmitted to indicate the incidence of such synchronizing wave forms which are then generated at the receive unit in the proper wave form and at the proper time as part of the output data.

The operation of the system transmit unit (FIG. 1) will now be considered. An input signal source 10 of any form (e.g., camera, recorder, standard television transmission receiver amplifier, or the like) supplies a standard base band video wave. The video signal is fed to a conventional analog-to-digital converter 11 which samples the incoming wave train at a rate of 8 megahertz under the control of a system clock of a microprocessor 15. The microprocessor 15 of FIG. 1 (and the receive microprocessor 23 of FIG. 2 below discussed) are described in greater detail below with reference to FIGS. 3 and 4, respectively. In brief, the microprocessor 15 recognizes the frame and line sync information from a sync detector 18 thereof, and activates a 600-byte current line memory 12 such that one line of scanned, 8 megahertz sampled television video information is stored therein. If this is the first line of frame, then the microprocessor 15 computes first, second and third order differences and encodes information according to algorithms described below.

The resultant code characterizing the video intensity is compared with the first line of the previous frame stored in a 64K byte prior frame memory 14 and either transmits a predetermined "same as last frame" code or a new code sequence (if the compared lines differ) to a 16-level modulator 16 while at the same time storing the code sequence as the first line in the prior frame memory 14. The 16-level modulator 16 is a per se conventional modulator used in data transmission such that 4 bits of digital data are transmitted per hertz of bandwidth. The output of modulator 16 modulates a conventional transmitter 17 to produce an output (at system point "C" of FIG. 1) for cable, microwave, satellite or other transmission media as provided by F.C.C. regulations and authorization. At the same time the stored information in the 600-byte current line memory 12 is transferred to the 600-byte previous line memory 13.

For the second and subsequent scanned lines of the frame, the microprocessor 15 compares byte by byte the contents of the current line memory 12 and the previous line memory 13. If the two records do not vary from one another except for single isolated bytes then the microprocessor 15 transmits the "same as last line" code to modulator 15 or "same as last frame" code as is appropriate. Single isolated byte differences are ignored for the reason previously indicated.

Figure 2:
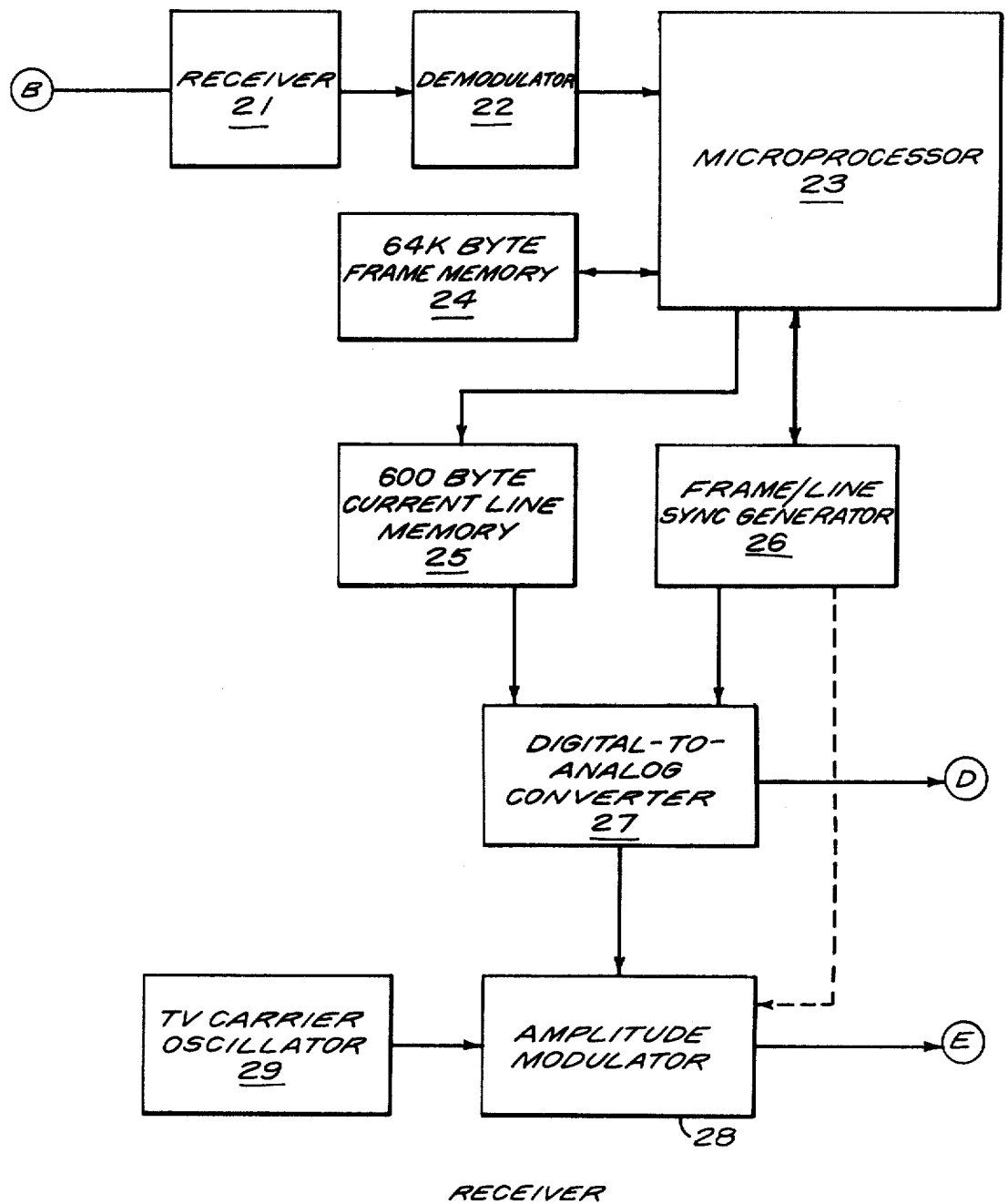
FIG. 2 is a block diagram of a receive unit in accordance with the invention.

Turning now to the FIG. 2 receive unit, the received signal (circuit point "B") is amplified and detected in a conventional receiver 21 matched to transmitter 17 and demodulated in conventional demodulator 22 to produce a digital pulse train which replicates that fed into the modulator 16. The pulse train is fed to microprocessor 23 which decodes the received information and translates the information into a pulse train identical to that originally stored in the transmitter current line memory 12 and stores same in a 600-byte current line memory 25. If the received mode is "same as last frame", then data is read from a 64K byte previous frame memory 24 by the microprocessor 23. For all other code trains, the code train is stored in the 64K byte memory 24 in sequence for use when next frame information is received.

The microprocessor 23 at each appropriate time, detected by a received sync pulse signalling code group, causes a frame or line sync signal to be generated by sync generator 26 followed by the constant rate pulse train from memory 25. The combined digital signals from elements 25 and 26 are fed to digital-to-analog converter 27 which produces standard video output at point "D" for direct viewing or local monitoring. The video output may also be applied to an amplitude modulator 28 such that an amplitude-modulated television radio frequency signal is produced at point "E" by modulating the output of a television carrier oscillator 29. A television signal (point "E") may be subsequently distributed by cable or broadcast by conventional means.

A microprocessor 15 is used in the transmit unit rather than individual integrated circuits to control signal processing since the overall size and cost are reduced. The description which follows applies equally if individual integrated circuits are used or if the circuitry is incorporated within the microprocessor.

The video signal (from point "A" of FIG. 1) is applied to sync detector 18 which uses conventional television circuitry to recognize the vertical and horizontal synchronizing pulses (frame and line sync). The detection of a vertical (frame) sync pulse causes the generation of the 8-bit code for zero followed by the 8-bit code for 255. The detection of a horizontal sync pulse causes the generation of the 8-bit code for 255. These codes are stored by the microprocessor 15 as the next byte or bytes in the prior frame memory 14. At the end of the sync pulse, the analog-to-digital converter 11 is turned on by the microprocessor 15 for the duration of one line of scan. The analog-to-digital converter 11 produces 8-bit bytes whose value equals the instantaneous amplitude of the video signal. These bytes are simultaneously transferred to the currrent line memory 12 and the corresponding byte of the prior line is transferred to the previous line memory 13. The corresponding byte of the previous line memory 13 is fed to the arithmetic unit of microprocessor 15 as is the byte going into current line memory 12 where the difference therebetween is computed. If fewer than two contiguous bytes differ by more than the least significant bit the process continues until the end of scan line; if not, the process stops. At the end of the scan line, an erase signal is generated. This signal is described subsequently.

At the same time as the foregoing occurs, the microprocessor performs the following arithmetic functions. The first, second and third differences are computed for the string of bytes from analog-to-digital converter 11. Adjacent bytes of differences are summed and shifted to the right by one bit (corresponds to averaging). Thus, a single byte which differs from the adjacent bytes would have a positive first difference followed by an equal negative first difference resulting in no change in information.

Second and third differences are treated in the same manner. If the first difference is zero, no digital data is produced at the output of the microprocessor, and the byte count is updated each time the analog-to-digital converter 11 samples the video voltage. When the first difference changes from zero, the microprocessor 15 transfers to the frame memory 14 the byte count and resets the byte count to zero. The byte count is the "velocity" information for transfer rate of the data. It appears in the frame memory as an 8-bit byte corresponding to numbers 96 through 105 followed by an 8-bit byte corresponding to numbers 64 to 95. If the first byte is omitted, the velocity is 2-33 cells per instruction. If the second byte is included, the velocity is given by the relationship:

$$v = (byte\ 1 - 95) \times 32 + (byte\ 2 - 64) + 1$$

This value is obtained by starting the count at binary 01000000 and incrementing the count by 1 on each sample of the analog-to-digital converter 11. When the binary count reaches 96 corresponding to 01100000, the second byte is generated as 01000000 and incremented accordingly. Each time the second byte reaches 96 the preceding byte is incremented by 1.

If the first difference is not zero but the second difference is zero when determined as previously described, then slope information is transmitted to the prior frame memory 14 as binary numbers from 128 to 191 corresponding to rates of change from −32 binary unit per cell to +32 binary units per cell. If the rate of change exceeds 32 binary units per cell then the rate of change byte is replaced by an amplitude change byte as a binary number from 1 to 63 followed by the slope change byte such that the sum of the two bytes equals the required change.

If only the third difference is zero then binary 224 is transmitted to the frame memory 14 followed by the value of the second difference as binary numbers 128 to 191.

If the third difference is not zero then amplitude changes as binary numbers from 1 to 63 are transmitted to the frame memory 14.

At the end of the scan line if the erase signal previously described is present, the stored information in frame memory 14 for that line is erased and a new horizontal sync code is written. Thus two adjacent sync codes signify that the scan line is the same as the previous scan line.

In interlaced systems, two vertical sync codes are sent alternately. The first at the start of the frame is an 8-bit binary "zero" followed by 8-bits-per-byte binary 255. On the interlace the vertical sync is a binary zero followed by an 8-bit-per-byte binary 254. The process described above for input processing continues line by scan line until the end of the frame.

At the same time, the microprocessor 15 subtracts the current binary line from the corresponding previous frame binary line as stored in prior frame memory 14. If the difference is zero then the current line is over-written with the 8-bit-per-byte binary number 240 to signify the "same as last frame". Every thirtieth frame the previous line memory 14 is suppressed causing the current binary lines to be stored for the entire frame.

At the clock rate of the 16-level modulator 16, the binary data in the prior frame memory 14 is read into the modulator which converts it to 16 levels of voltage for modulating the transmitter 17. The modulator 16 and transmitter 17 can be any conventional amplitude or frequency-modulated transmission system as may be used in ground microwave links, satellite networks or on cable systems. It may be part of multi-channel time division or frequency division multiplexing system.

Receiver 21 and demodulator 22 of the receive unit are conventional equipment matched to the modulator 16 and transmitter 17 of the transmit unit such that the output of demodulator 22 is the identical binary pulse train as was read into modulator 16 from the prior frame memory 14. This pulse train is stored by microprocessor 23 in 65K byte memory 24. The presence of the "same as last line" code causes the preceding line to be stored in its entirety rather than as the code word. When the code for "same as last frame" is received, the matching scan line from the last frame is stored in its proper sequence by duplicating the complete line in the frame memory 24. At the same clock rate as used for the analog-to-digital converter 11, the microprocessor 23 fills the current memory with 8-bit binary bytes corresponding to the code instructions stored in the frame memory 25. The frame and line sync generator 26 is triggered every 1/60 of a second when the frame or interlace codes are received and every 63.5 micro-seconds corresponding to each line sync code. Subsequent to each frame or line sync pulse, the 600-byte current memory is dumped one-byte for each clock pulse into digital-to-analog converter 27. Frame/line sync generator 26 may be a conventional analog sync generator, in which case its output goes directly to amplitude modulator 28 (dotted line); or it can be a digital generator and go to converter 27. The output of the generator 26 includes the horizontal and vertical blanking pulses as well as the synchronizing pulses.

The present 8-bit binary count code, which corresponds to binary 96 through 105 followed by binary 64 to 95, causes the preceding binary value to be repeated and stored in the current memory 25 as many times as are specified by the value of the count code word. The presence of a code words corresponding to binary numbers 1 through 63 increments the previously stored binary number by this value and stores it in current memory 25. The presence of code words corresponding to binary numbers 128 to 191 causes the previously stored binary number to be incremented from −32 to +32 binary units. If followed by count code, then incrementing occurs as many times as specified by count code, and stored in memory 25.

If a binary 224 is received then the previously stored value is again incremented by the previous increment value. All other code words are decoded and result in binary values being stored in current line memory 25.

Values in current line memory 25 are transferred to the digital-to-analog converter 27 at the clock rate where the binary values are converted to corresponding vaoltages which are applied to the input of amplitude modulator 28. They also are amplified and made available as video voltages at output point "D". The voltages from converter 27 amplitude modulate the carrier oscillator from carrier oscillator 29 via the modulator 28 to produce amplitude-modulated radio-frequency signals at circuit point "E".

Figure 3:
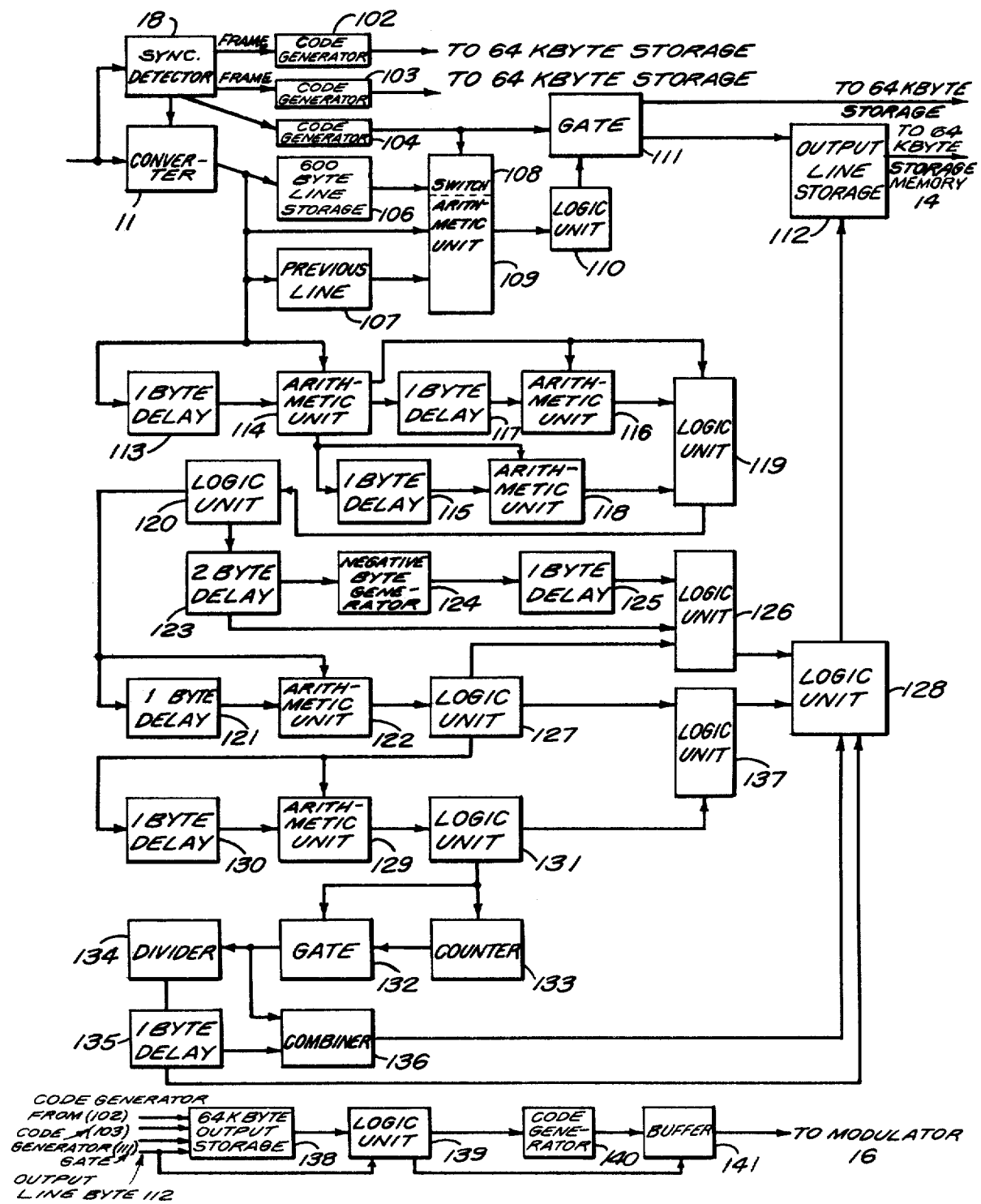
FIG. 3 is a more detailed schematic block diagram of the microprocessor in the transmit unit of FIG. 1.

The microprocessor 15 of the transmitter unit of FIG. 1 is illustrated in greater detail in FIG. 3. The analog sync signal from sync detector 18 is received in a detector 101 where the sync signal is separated into frame, interlace frame, and line sync signals. These signals are applied either to code generator 102 or 103, which, in response to these inputs, each produce a 16-bit train of pulses corresponding to a binary of 255 and 254, respectively, for the frame and interlace frame signals. A line sync signal is applied to a code generator 104, which, in response, produces an 8-bit train of pulses corresponding to a binary of 255. These outputs at code generators 102 and 103 are transferred directly to 64K byte prior frame memory 14. The synchronizing pulse from sync separator 18 is also applied to analog-to-digital converter 11, and the presence of a synchronizing pulse blocks analog-to-digital converter 11 from operating. Converter 11 may be a conventional single integrated circuit similar to TRW LSI Products model TDC 1027.

The remainder of the components shown in block form in FIG. 3 are part of the microprocessor 15, which may be similar to a TSD Display Products, Inc. model MC 68000 with 256K Byte CPU RAM storage 32K Byte peripheral PROM storage, and 32K Byte video RAM storage. The block diagram of FIG. 3 describes the signal processing to be programmed into the microprocessor.

The output of the analog-to-digital converter 11, between sync pulses, is fed to a 600 byte line storage area 106 where one line of digital data corresponding to the video information is stored. At the same time, each byte of data is compared to the data stored in a previous line storage area 107, byte by byte, in arithmetic unit 109 by subtracting the two signals from one another. A switch 108 at the input to the arithmetic unit, which is driven by the signal from code generator 104, causes line storge area 107 to alternately become current line storage while line storage area 106 becomes the previous line storage area. The output differences are fed to a logic unit 110. If the signal to logic unit 110 never exceeds 1 unit when the new line is the same as the previous line and gate 111 is triggered resetting an output line storage area 112 to be reset without transmitting any signals to the 64K Byte storage memory 14 other than the new line sync signal from code generator 104. If the signal to logic unit 110 exceeds 1 unit then the digital data stored in output line storage 112 is transferred to the 64K Ybte memory 14, and the modulator 16 at the output clock rate.

At the same time, the digital signal from converter 11 is fed to 1 byte delay 113, and to an arithmetic unit 114, which calculate the first difference and transmits the output to a 1 byte delay 115 and to an arithmetic unit 116 via a 1 byte delay 117. The output of arithmetic unit 116 is the second difference. The first difference at the output of arithmetic unit 114 is applied to an arithmetic unit 118 which also receives the previous first difference from the 1 byte bit delay 115. Arithmetic unit 118 sums the two signals, divides by two (corresponding to a 1 bit shift), and applies its output to a logic unit 119 which compares the outputs from arithmetic units 116 and 118. If the absolute value of the output of arithmetic unit 116 exceeds the absolute value of the output of arithmetic unit 118, the former is applied to a logic unit 120. If the output of arithmetic unit 118 is greater than that of unit 116, it is applied to logic unit 120. If the second difference is less than or equal to 1 unit (least significant bit) then the signal from logic unit is passed via a 1 byte delay 121 to an arithmetic unit 122 and also directly to arithmetic unit 122. If the second difference is greater than 1 unit, the first difference signal from logic unit 119 goes to a 2 byte delay 123 and then to a negative byte generator 124, which is activated if the first difference is negative. Negative byte generator 124 produces a binary pulse group corresponding to the decimal number 244, which is transmitted through a 1 byte delay 125 to one input of a logic unit 126. The direct signal from 123 is also transmitted to another input of logic unit 126.

The output of arithmetic unit 122 which is the modified second difference, is also applied to a logic unit 127. If the second difference output from logic unit 127 is not greater than 1 unit then logic unit 126 is inhibited from transferring data to a logic unit 128 by the inhibit signal from logic unit 127. If the second difference is less than 1 unit, then the output of logic unit 127 is applied to an arithmetic unit 129 via a 1 byte delay 130 and also directly to arithmetic unit 129. The output of arithmetic unit 129 is the third difference and is applied to a logic unit 131. If the third difference is greater than 1 unit then the signal from logic unit 131 to a gate 132 inhibits the output of a counter 133 and resets the counter to zero. The output of counter 133 through gate 132 drives a divider 134 which counts one unit for every 32 counts of counter 132. This output is delayed by a 1 byte delay 135 and combined with the output of gate 132 in a combiner 136, the output of which goes to another input of logic unit 128.

If logic unit 137 is not inhibited by a signal from logic unit 131, then the second difference is transferred to logic unit 128. Logic unit 128 transfers the first difference to a 600 byte output storage 112 if it is greater than zero, and the byte equal to decimal 244 if there is a change in sign. Otherwise logic unit 128 transfers the second difference if it is greater than zero, or the counter signals if they are greater than 63. Counter 133 counts from 64 to 95 and resets to binary 63 (00111111), and divider 134 counts from 96 to 105 and resets to 0. Between sync signals, the coded digital output of output line storage 112 goes to a 64K Byte output storage 138. Each byte from output line storage 112 is compared to the corresponding byte from the last frame previously stored in output storage 138 in a logic unit 139, which activates a code generator 140 if all bytes are the same as previously stored. Code generator 140 transfers the byte equal to decimal 240 to a buffer 141 when the next sync code arrives from code generator 102 or 103 or from gate 111. If any byte of the signal from output line storage 112 differs from the previously stored code for line, then the data stored in output storage 138 is transferred to buffer 141. The data in buffer 141 is transferred to modulator 16 at the modulator clock rate.

Figure 4:
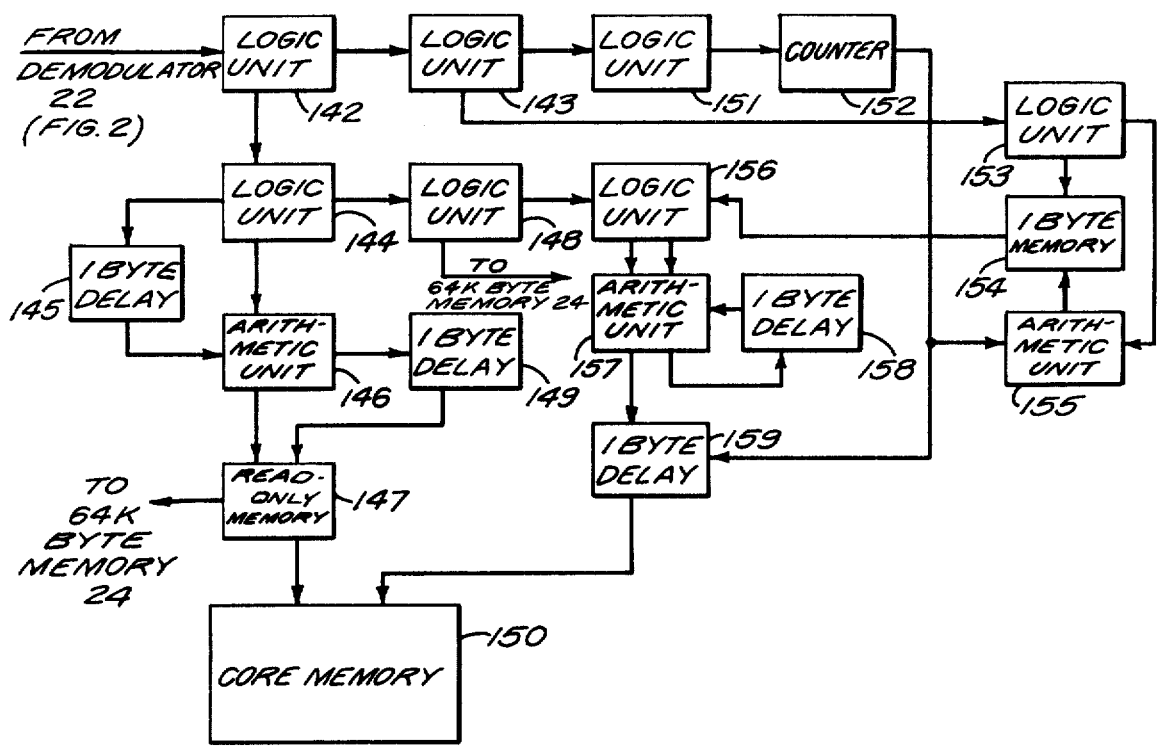
FIG. 4 is a more detailed schematic block diagram of the microprocessor in the receive unit of FIG. 2.

With reference now to FIG. 4, which illustrates the logic flow chart for the receive microprocessor 23, the demodulator signal from demodulator 22 is applied to a logic unit 142. If the numerical value of the received byte is greater than binary 0, and is less than 193, then data is transferred from logic 142 to a logic unit 143; if the numerical value of the received byte is not greater than binary 0, then the byte is transferred to a logic unit 144. If the value of the byte is zero in logic unit 144 then it is transferred to a 1 byte delay 145. If the value of the byte is greater than 244 then it is transferred to an arithmetic unit 146 where the inverse of binary 0 (i.e., 11111111) is added to the signal from logic unit 144. If the ouput of arithmetic unit 146 is zero than a read-only memory 147 is triggered to produce a frame signal such that the digital-to-analog converter 17 in the receiver unit (FIG. 2) will produce the voltage waveform specified for NTSC stand frame sync. If the output of arithmetic unit is 1, then an interlace signal is produced. If the output is 255 (i.e., the previous byte was not zero), then a line sync signal is produced. If the value of the byte applied to logic unit 144 is 224, 240, or 244 then the signal is transferred from logic unit 144 to a logic unit 148. If the output of arithmetic unit 146 is the binary of 255, then a signal is applied to a 1 byte delay 149. The simultaneous output of the same signal from arithmetic unit 146 and 1 byte delay 149 prevents the production of a second line sync signal from read-only memory 147 until the previous line has been read from memory. A signal from read-only memory 149 to 64 byte frame memory 24 causes the previous line to be recopied into memory together with the binary word for line sync.

The output of read-only memory 147 is transferred to a core memory 150 in the microprocessor as an appropriate sync signal binary message. If the input to logic unit 148 is the binary equivalent of decimal 240 then the signal applied to the 64 byte memory 24 copies the same line of the previous frame into a new position in this memory. If the input to logic unit 147 is decimal 244 than a sign change is caused for all values 1 to 63; if the input is decimal 224 then the signals are second differences.

The output of logic unit 143 is divided into three groups:

a. Decimal values 1 to 63 b. Decimal values 128 to 191.

c. Decimal values 64 to 105.

If the decimal values are 64 to 105, the signal from logic unit 143 is transferred to a logic unit 151 which sets a decrementing counter 152 to a value given by:

$$v = (\text{byte } 1 - 95) \times 32 + (\text{byte } 2 - 64) + 1$$

If the decimal values are 1 to 63 or 128 to 191 then the output of logic unit 142 goes to a logic unit 153, which transfers values 1 to 63 to a 1 byte memory 154 and values 128 to 191 to an arithmetic unit 155. Each succeeding value 1 to 63 or 128 to 191 causes the transfer of the value stored in memory 154 and arithmetic unit 155 and replaces them with a new value or zero. If the values are between 1 and 63, then the value is transferred to a logic unit 156 which causes the value from 1 byte memory 154 to be added or subracted in arithmetic unit 157 from the previous value stored in 1 byte delay unit 158 such that the resultant value transferred to a 1 byte delay 159 is equal to the absolute value of the desired output voltage. When the count at counter 152 is greater than zero, it starts to decrement and transfers the value stored in 1 byte delay 159 to the core memory 150 of the microprocessor 25. If the signal at logic unit 153 is between 128 to 191 decimal then that value is transferred to arithmetic unit 155 and subtracted from 1 byte delay 159. The resultant is transferred to 1 byte memory 154 as many times as controlled by decrementing counter 152. For example, for a line going from maximum white to maximum black in a linear fashion, the signal code would be a second difference value followed by a counter setting value. This would cause 1 byte delay 159 to increase at every counter decrement by the amount stored in arithmetic unit 155.

As an alternative arrangement, frame/line sync generator 26 can be used to produce the sync signals produced by read-only memory 147, in which case the data in core excludes sync signals. Each line of digital data is read from the core memory into 600 byte current line memory 25 and then transferred to digital to analog converter 27, which may be, for example, Datel-Intersil Model DAC-8308 or equivalent.

As can readily be seen from the preceding description of a presently preferred embodiment of the invention, color television signals can be similarly processed since the color information is also a line-by-line scanned wave form between synchronizing pulseks. Several alternatives are available:

1. Transmit the coded composite of intensity and color scan information as sequential strings of digital data on a line-by-line basis using wave forms independently for creating code.

2. Transmit coded intensity from intensity wave form and coded descriptions of the three color components on a color-by-color basis with each color being coded separately and transmitted sequentially.

3. Transmit coded intensity from intensity wave form on one carrier and coded color wave form on separate carrier or sub-carriers.

The last method is preferred, at this time, because of availability and economics of components.

Audio information associated with television transmission can be transmitted in several ways:

1. Compand audio wave form and digitize and incorporate as an information packet at the end of each frame. Expand after reception, and effect a digital-to-analog conversion followed by signal expansion.

2. Frequency modulate the carrier of the digital information where the digital modulation is amplitude modulation.

3. Amplitude modulate the carrier of the digital information where the digital modulation is frequency modulation.

4. Frequency modulate a sub-carrier or independent carrier as is done in NTSC television.

Using currently available components, the preferred method is number 1.

Inter-frame control signals are transmitted as a digital packet.

The variable velocity scanning system described herein lends itself to several levels of encoding for maintaining the privacy of the transmission:

1. Provide a paper card with a magnetic coded strip to each user on a program, daily, weekly or monthly basis such that the combination of the binary serial number of the decoding microprocessor and the coded strip provide a repeating coded string which when digitally added to the incoming coded transmission will permit generating the correct series of binary words to the current memory 25 and to generate the frame and line sync pulses from generator 26. A typical coding scheme is as follows:

a. At the transmitter add 01010101 to each byte after frame code.
   b. At the receiver (assuming a serial number to be 11100001 00011111), add serial number to coded strip number 11001010 100001100 such that the resulting sum is 00000000 0000 0000 and coded information is now in the clear.

2. Convert only intensity information at central location at converter 27. Transmit encoded frame and line sync information directly from the generator 26 to modulator 28. Thus, information received at final user has neither blanking nor synchronizing pulses. Decoding at the final user restores frame and line synchronization and blanking pulses.

3. Transmit coded digital audio as described in "1" above. Decode at final user.

Other combinations of the above may be used. For current economic and component availability reasons, "2" above in combination with "3" above are preferred. Any substitution coding scheme, no matter how complex, may also be used where the equipment complexity and cost are justified by the confidentiality of the information transmitted.

The above-described arrangement is merely illustrative of the principles of the present invention. Numerous modifications and adaptations thereof will be readily apparent to those skilled in the art without departing from the spirit and scope of the present invention.

What is claimed is:

1. In combination in means for processing and transmitting a television signal; an analog-to-digital converter for generating sampled digital values of a television signal; a current line memory connected to a previous line memory means for storing the digital values for a current and previous television signal line, respectively; a prior frame code group memory for storing the code group transmitted during corresponding lines of a prior frame; microprocessor means connected to said analog-to-digital converter to said current line and previous line memories, and to said prior frame code group memory, said microprocessor means including code generating means for generating predetermined code groups signalling a correspondence between the sampled television line being processed, a previous line stored in said previous line memory or the corresponding line of the previous frame stored in said memory therefor, intra-line code producing means for generating coding characterizing changes within a line, and code output supplying means for selecting the outgoing code group from the outputs of said code generating means and said intra-line code producing means.

2. A combination as in claim 1, further comprising synchronizing signal detecting means receiving the television signal being processed and having an output connected to said microprocessor, said microprocessor including sync code supplying means for supplying a code signalling the incidence of said synchronizing pulses to said code output supplying means.

3. A combination as in claim 1 or 2, further comprising a transmitter, and a plural level modulator connecting said microprocessor and said transmitter.

4. A combination as in claim 1, further comprising at least one receiver means including means for receiving the output of said television signal processing and transmitting means, and restoring means for restoring the received signal to conventional television signal format in sampled digital form.

5. A combination as in claim 4, wherein said receiver means includes prior frame code group and current line memories, a microprocessor connected to said prior frame and current line memories and including means responsive to the received signal and the contents of said prior frame memory for generating sampled digital values of current line video information for entry in said current line memory.

6. A combination as in claim 5, wherein said receiver means further comprises a carrier oscillator and modulator, and a digital-to-analog converter coupling said restored signal to said modulator.

7. A combination as in claim 6, wherein said receiver means further comprising a sync generator enabled by said microprocessor receiving a synchronizing signal incidence code for supplying synchronizing signal wave.

8. In combination in television signal processing means; transmitter means including a microprocessor, and coding means for generating a digital encoding for each line of a video wave, said digital encoding occupying a variable period dependent upon the line wave intelligence, said coding means including converting means for converting an incoming video wave to digital form, said microprocessor including code generating means connected to said converting means for generating a sync interval outgoing code for such intervals and for providing an outgoing digital encoding characterizing the line of video information then being processed; said code generating means comprising first means for signalling a correspondence between a video line being processed and a stored prior line, second means for generating a series of variable duration signal line change encoding signals characterizing a line being processed, and output means for operatively selecting the generated output of said first means when a correspondence is determined and, in the absence of such a correspondence, operatively selecting the output of said second means; sync detecting means connected to said microprocessor for indicating thereof the incidence of sync intervals; and at least one receiver means coupled to said transmitter means and including a microprocessor including means for reconverting said outgoing digital encoding to a standard video format and synchronizing signal generating means connected to an output of said receiver microprocessor.

9. A combination as in claim 8, wherein each of said transmitter means and receiver means includes a microprocessor.

10. A combination as in claim 9, wherein each of said transmitter and receiver means includes a current line memory, and a previous frame memory for storing encoded line information for the previous video frame.

11. A combination as in claim 8, wherein said transmitter means further includes a transmitter, and a multilevel modulator connecting said transmitter microprocessor and said transmitter.

* * * * *